C. LUNDE.
DRAFT APPLIANCE.
APPLICATION FILED JUNE 17, 1909.

932,561.

Patented Aug. 31, 1909.

Witnesses
Phil E. Barnes
J. J. Sheehy Jr.

Inventor
Charles Lunde.
by James J. Sheehy
Attorney

UNITED STATES PATENT OFFICE.

CHARLES LUNDE, OF MARSHALLTOWN, IOWA, ASSIGNOR OF ONE-HALF TO ANTON SCHEID, OF MARSHALLTOWN, IOWA.

DRAFT APPLIANCE.

932,561. Specification of Letters Patent. Patented Aug. 31, 1909.

Application filed June 17, 1909. Serial No. 502,764.

*To all whom it may concern:*

Be it known that I, CHARLES LUNDE, citizen of the United States, residing at Marshalltown, in the county of Marshall and State of Iowa, have invented new and useful Improvements in Draft Appliances, of which the following is a specification.

My invention has to do with the connection of gang and other plows with traction engines and the like; and it contemplates the provision of an appliance susceptible of ready connection to a traction engine, and embodying such a construction that a plurality of plows may be easily connected with the engine and arranged advantageously and in such manner that in the event of one of the plows striking a large stone or other obstruction in its path, the plows will be automatically released and damage to the plow that encounters the obstruction will be precluded.

Figure 1:
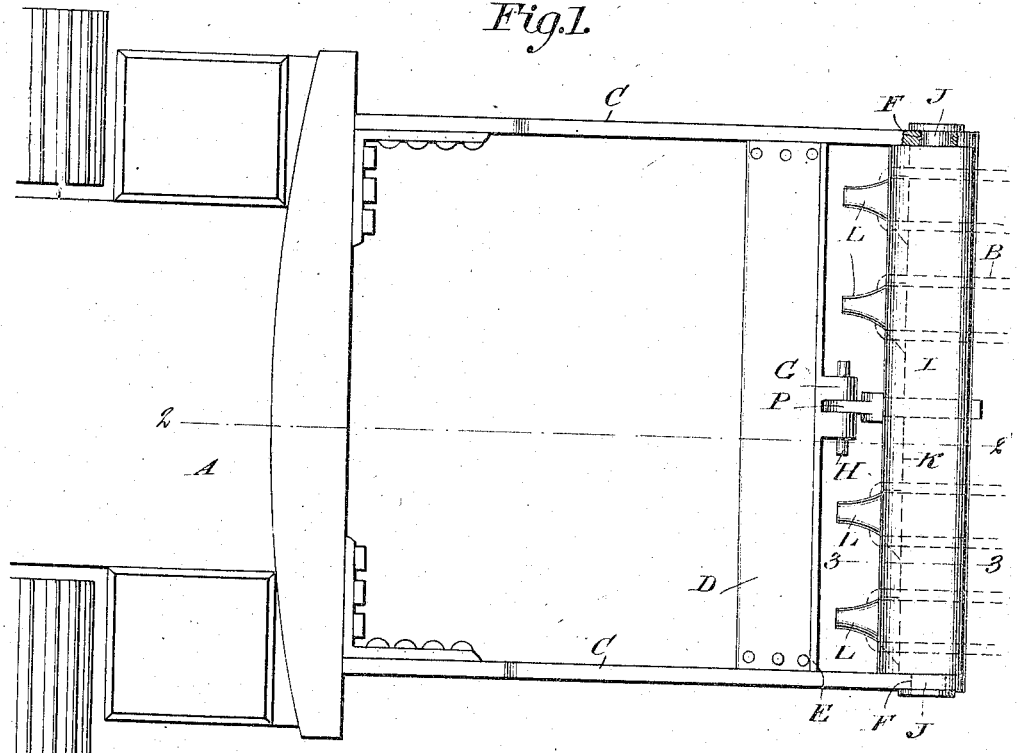
Figure 2:
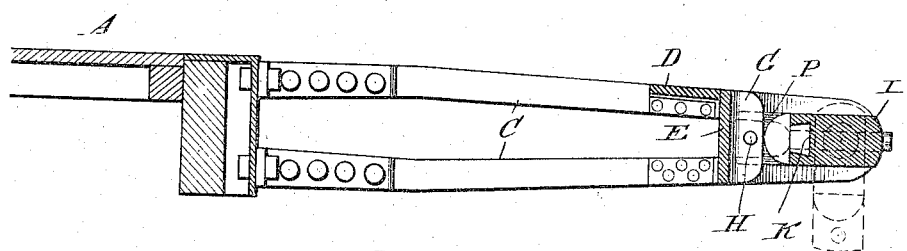
Figure 3:
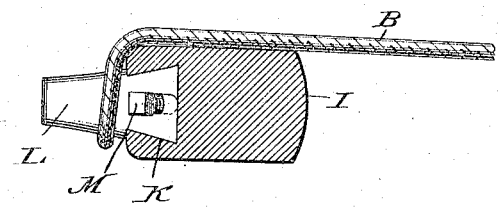

With the foregoing in view, the invention will be fully understood from the following description and claims when the same are read in connection with the drawings, accompanying and forming part of this specification, in which:

Figure 1 is a plan view showing the manner of attaching my novel appliance to the rear end of a traction engine and also showing the manner in which chains designed to serve as draft cables for plows are looped over the cable pins of the appliance. Fig. 2 is a longitudinal vertical section, taken in the plane indicated by the line 2—2 of Fig. 1, and showing by dotted lines the position the rock-shaft assumes to release the plow cables or chains when the weak pin hereinafter referred to is broken by the excessive draft incidental to a plow bringing up against a large stone or other obstruction. Fig. 3 is an enlarged detail section taken in the plane indicated by the line 3—3 of Fig. 1 and showing the manner in which the cable pins are arranged in the rock-shaft and also showing the means for adjustably fixing the said pins with respect to the rock-shaft so as to permit of the plow connections being positioned to the best advantage.

Similar letters designate corresponding parts in all of the views of the drawings, referring to which:

A is the rear portion of a traction engine.

B B are cables, preferably in the form of looped devices as shown, designed to be connected with and extend forwardly from plows (not shown) in the conventional manner or in any other manner consonant with the purpose of my invention.

Fixed with respect to and extending rearwardly from the traction engine A are parallel frame bars C which are connected together at an intermediate point of their length through the medium of transverse bars D and E, the bar D being disposed horizontally, and the bar E vertically as shown. The bars D and E are fixed with respect to the side bars C in the manner shown or in any other suitable manner, and the bars C are provided in rear of the transverse bar E, with transversely disposed journal bearings F.

On its rear side, the transverse frame bar E is provided with a clevis G, and removably arranged in and extending transversely through the said clevis is a weak pin H— *i. e.*, a pin made of wood or other comparatively weak material. At this point I would have it understood that with the exception of the weak pin H, the appliance in the preferred embodiment of the invention is made of metal.

I is the rock-shaft of the appliance, having end trunnions J journaled in the bearings F of the frame bars C. In its side that is normally foremost the rock-shaft I is provided with a longitudinal groove K, of dovetail form in cross-section, and in the said groove are arranged the correspondingly shaped shanks of the cable pins L. It will also be seen by reference to Fig. 3 that the shank of each pin L is provided with a set screw M for engaging the rock-shaft I, and that therefore each pin may be adjustably fixed to the rock-shaft in various positions as occasion demands.

Carried by and extending forwardly from the rock-shaft I is an arm P that is adapted to normally rest in the bifurcation of the clevis G, and in the said arm P is a transverse aperture in which normally rests the weak pin H.

In the practical use of my novel appliance the cables or chains B are looped over the pins L in the manner shown, and it will here be noted that either one or a plurality of cables may be looped over each pin according to the number of plows that it is desired to hitch to the traction engine. By reason of the placing of the cables or chains on the pins L in the manner described, it will be manifest that the plows will be drawn through the earth in orderly fashion so long as the plows do not encounter material obstructions. In the event, however, of any one of the plows bringing up against a large stone or other practically immovable obstruction, the increased draft will operate to break the weak pin H and release the arm P of rock-shaft I, whereupon the said shaft I will turn about its axis until the pins L are directed rearwardly, when the cables or chains B will slip off the said pins, and damage to the obstructed plow or plows will be prevented.

In addition to the practical advantages herein before ascribed to my novel appliance, it will be noted that the same is simple, compact and inexpensive in construction, and is well adapted to withstand the exposure to which draft appliances are ordinarily subjected.

Having described my invention, what I claim and desire to secure by Letters-Patent, is:

1. In a draft appliance, the combination of a rock-shaft having a longitudinal groove of dovetail form in cross-section, pins having correspondingly shaped shanks adjustably arranged in said groove, and set screws bearing in the shanks and adapted to be engaged with the rock-shaft.

2. In an appliance for the purpose described, the combination with a frame comprising side bars having journal bearings, and a cross bar connecting said side bars, in front of said bearings, and having on its rear side a clevis made up of apertured portions separated by an intervening space; of a rock-shaft journaled in said bearings and having a longitudinal groove, of dovetail form in cross-section, and also having an apertured arm, a weak pin extending through the clevis portions and said arm, pins having dovetail shank portions arranged in said groove, and set screws carried by said shank portions.

In testimony whereof I have hereunto set my hand in presence of two subscribing witnesses.

CHARLES LUNDE.

Witnesses:
JOHN KREY MARX,
ANTON SCHEID.